United States Patent [19]

Ito

[11] Patent Number: 5,598,134
[45] Date of Patent: Jan. 28, 1997

[54] ELECTROMAGNETIC POWER SUPPLYING APPARATUS FOR ELECTRIC MOTOR VEHICLE

[75] Inventor: Makoto Ito, Kariya, Japan

[73] Assignee: Kabushiki Kaisha Toyoda Jidoshokki Seisakusho, Kariya, Japan

[21] Appl. No.: 466,398

[22] Filed: Jun. 6, 1995

Related U.S. Application Data

[63] Continuation-in-part of Ser. No. 153,759, Nov. 17, 1993, abandoned.

[30] Foreign Application Priority Data

Nov. 19, 1992  [JP]  Japan .................................. 4-310456

[51] Int. Cl.$^6$ ............................. H01F 27/26; H01F 27/30
[52] U.S. Cl. ........................... 336/83; 336/210; 336/212; 336/DIG. 2
[58] Field of Search ........................... 336/83, 131, 212, 336/132, DIG. 2, 200, 210; 320/2

[56] References Cited

U.S. PATENT DOCUMENTS

| | | | |
|---|---|---|---|
| 3,534,310 | 10/1970 | Pelissier | 336/DIG. 2 |
| 3,743,989 | 7/1973 | Nicolas et al. | 336/DIG. 2 |
| 4,087,774 | 5/1978 | Beuchat | 336/DIG. 2 |
| 4,347,472 | 8/1982 | Lemelson . | |
| 4,496,896 | 1/1985 | Melocik et al. . | |
| 5,216,402 | 6/1993 | Carosa | 336/83 |

FOREIGN PATENT DOCUMENTS

| | | | |
|---|---|---|---|
| 63-73837 | 4/1988 | Japan . | |
| 2252208 | 7/1992 | United Kingdom | 336/200 |

*Primary Examiner*—Thomas J. Kozma
*Attorney, Agent, or Firm*— Brooks Haidt Haffner & Delahunty

[57] ABSTRACT

An electromagnetic power supplying apparatus for an electric motor vehicle includes a removable primary core and a secondary core. The primary core with a primary coil wound therearound is formed in the shape of a pillar having a reduced height. The secondary core with a secondary coil wound therearound is disposed on a vehicle body and has a cross-section formed in a letter "O" shape surrounding the primary core. When positioning the primary core within the secondary core, i.e., when fitting the primary core into the secondary core, there is formed a tripod type closed magnetic circuit core. The primary core is formed with only the center leg member of the tripod type closed magnetic circuit core, and accordingly it is remarkably light in weight relative to the secondary core. Further, when the secondary core is provided with a guide surface flush with one of the magnetic flux in-out end surfaces of the primary core, the primary and secondary cores are protected from breaking during the positioning.

5 Claims, 8 Drawing Sheets

FITTING DIRECTION OF PRIMARY CORE INTO SECONDARY CORE

ELECTROMAGNETIC POWER SUPPLYING APPARATUS FOR ELECTRIC MOTOR VEHICLE

This is a Continuation-in-Part application of Ser. No. 08/153,759, filed Nov. 17, 1993, now abandoned.

BACKGROUND OF THE INVENTION

1. Field of the Invention

The present invention relates to an electromagnetic power supplying apparatus.

2. Description of Related Art

There is disclosed a method for supplying electric power to an electric motor vehicle in U.S. Pat. Nos. 4,347,472, 4,496,896 and Japanese Unexamined Patent Publication (KOKAI) No. 63-73,837. In the method, a secondary core with a secondary coil wound therearound is fixed on the front or on the bottom of an electric motor vehicle driven with a battery, and a primary core with a primary coil wound therearound is fixed on the ground. The electric motor vehicle is operated so as to position and join the primary core and the secondary core. Thus, a closed magnetic circuit with a gap is constituted between the primary and secondary cores, thereby supplying electric power to the electric motor vehicle.

However, in the conventional method disclosed in the aforementioned publications, it is extremely hard to position the primary and secondary cores, and accordingly it is inevitable to permit to roughly carry out the positioning. Such rough positioning inevitably results in the deteriorated electric power conversion efficiency (i.e., the secondary effective electric power/the primary effective electric power). In order to improve the electric power conversion efficiency, it is inevitable to enlarge the primary and secondary cores, but it is impossible to sharply improve the electric power conversion efficiency only by enlarging the cores. In addition, in the conventional method, in accordance with the configurations and positions of the primary cores fixed on the ground, the configurations and positions of the secondary cores fixed on the body of the electric motor vehicle must be determined. Accordingly, a heavy restriction is imposed on designing the electric motor vehicle.

SUMMARY OF THE INVENTION

In view of the problems associated with the conventional method, the present inventors thought of a primary core with a primary coil wound therearound which can be held by a user, positioning such a primary core within a secondary core, and supplying electric power while maintaining the assembled state. If such is the case, the gap can be reduced because the positioning can be carried out precisely, and accordingly the primary and secondary cores can be downsized.

However, when the primary core is held and positioned to the secondary core by a user, there arises the following problem. Namely, although the conventional primary cores with the primary coils wound therearound have been downsized, they still have a considerable weight. Hence, when the user holds and moves the primary core so as to precisely carry out the positioning, a heavy load is applied to the wrist of the user.

It is therefore a primary object of the present invention to provide an electromagnetic power supplying apparatus for an electric motor vehicle whose primary core can be remarkably reduced in weight so as to be portable.

When a primary core and a secondary core are downsized in such a manner, the areas of the magnetic flux in-out end surfaces thereof are likely to be small. Accordingly, it is required to strengthen the joint between the magnetic flux in-out end surfaces and to reduce the gap length in order to reduce the magnetic resistance at the gap. However, when the gap length is reduced, it is necessary to precisely position the primary core to the secondary core. As a result, the positioning operation becomes a demanding one.

It is therefore a secondary object of the present invention to reduce the gap length without complicating the positioning of the primary core to the secondary core.

When an electromagnetic power supplying apparatus employs down-sized primary and secondary cores, it is preferably adapted to supply electric power having a high frequency. Accordingly, it is appropriate to constitute the primary and secondary cores by using a ferrite core in which no eddy current loss takes place substantially. However, the ferrite core is brittle and susceptible to shocks. Hence, there arises a problem which is associated with the shocks exerted during the positioning of the primary core to the secondary core.

It is therefore a tertiary object of the present invention to provide an electromagnetic power supplying apparatus which is capable of reducing the shocks exerted to the primary and secondary cores during the positioning of the cores.

An electromagnetic power supplying apparatus for an electric motor vehicle according to the present invention can carry out the aforementioned objects, and it includes:

a movable primary core with a primary coil wound therearound, the primary core being formed in a shape of a pillar having a reduced height; and a secondary core with a secondary coil wound therearound, the secondary core being disposed on a vehicle body, having a cross-section formed in a letter "O" shape surrounding the primary core and including magnetic flux in-out end surfaces capable of joining to magnetic flux in-out end surfaces of the primary core, thereby constituting a closed magnetic circuit with a gap when the magnetic flux in-out end surfaces are joined.

In the present invention, the phrase, the secondary core having a cross-section formed in a letter "O"-shape, covers constructions having a projection at a portion which contacts with an opposite end surface of the primary core formed in a pillar shape having a reduced height.

Further, the present electromagnetic power supplying apparatus can preferably include a guide surface formed on the vehicle body and adjacent to the secondary core, and having a surface that is flush with at least one of the magnetic flux in-out end surfaces of the secondary core, and adapted for guiding fitting of the primary core into the secondary core to joining positions of the magnetic flux in-out end surfaces of the primary and secondary cores.

Furthermore, in another preferred form of the present electromagnetic power supplying apparatus, at least one of the magnetic flux in-out end surfaces of the primary core has a tapered surface tapered from wide to narrow in the direction of the fitting of the primary core into the secondary core.

The present electromagnetic power supplying apparatus operates as follows. The secondary core (i.e., the electric power receiving side) with the secondary coil wound therearound is fixed on the electric motor vehicle, and the primary core (i.e., the electric power transmitting side) with the primary coil wound therearound is positioned within the secondary core. The primary core to be moved is formed in a pillar shape having a reduced height, and the secondary core is formed in a letter "0"-shaped cross-section surrounding the primary core. With these arrangements, when the primary core is fitted into the central portion of the secondary core, it is possible to constitute a tripod type closed magnetic circuit in which the leakage magnetic flux is less likely to occur because the gaps of the closed magnetic circuit are surrounded by the secondary core. In addition, the primary core can be constituted with the center leg member of a tripod type closed magnetic circuit core alone. Consequently, the primary core can be lightweighted much more than the secondary core is.

The tripod type closed magnetic circuit core herein means a core capable of forming a closed magnetic circuit in which a center leg member and a pair of end leg members disposed on the sides of the center leg member, are magnetically connected to a first base at their ends, and they are magnetically connected to a second base at their opposite ends.

Further, in the case that the vehicle body is provided with a guide surface, and that the guide surface has a surface flush with at least one of the magnetic flux in-out end surfaces of the secondary core and it is adapted for guiding the fitting of the primary core into the secondary core to the joining positions of the magnetic flux in-out end surfaces of the primary and secondary cores, the primary and secondary cores are less likely to collide with each other during the positioning operation (i.e., during the fitting of the primary core into the secondary core). As a result, the primary and secondary cores can be inhibited from being damaged.

Furthermore, in the case that at least one of the magnetic flux in-out end surfaces of the primary core has a tapered surface tapered from wide to narrow in the direction of the fitting of the primary core into the secondary core, the magnetic flux in-out end surfaces of the primary and secondary cores can be brought into close contact with each other by simply fitting the primary core into the secondary core. As a result, without carrying out the positioning operation highly accurately, the gap length can be reduced sharply.

Moreover, in accordance with the present invention, the primary and secondary cores can be down-sized without deteriorating the electric power conversion efficiency. Hence, the degree of freedom can be improved in terms of the selection on the disposing positions of the secondary core. For instance, the secondary core can be disposed on the rear of the electric motor vehicle, on the top thereof, or the like.

In addition, in accordance with the present invention, after the primary core is guided to the location where it joins the secondary core and it is positioned thereto, the primary core can be inhibited from displacing. Consequently, the electric power conversion efficiency can be inhibited from degrading.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclose.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

Figure 1:
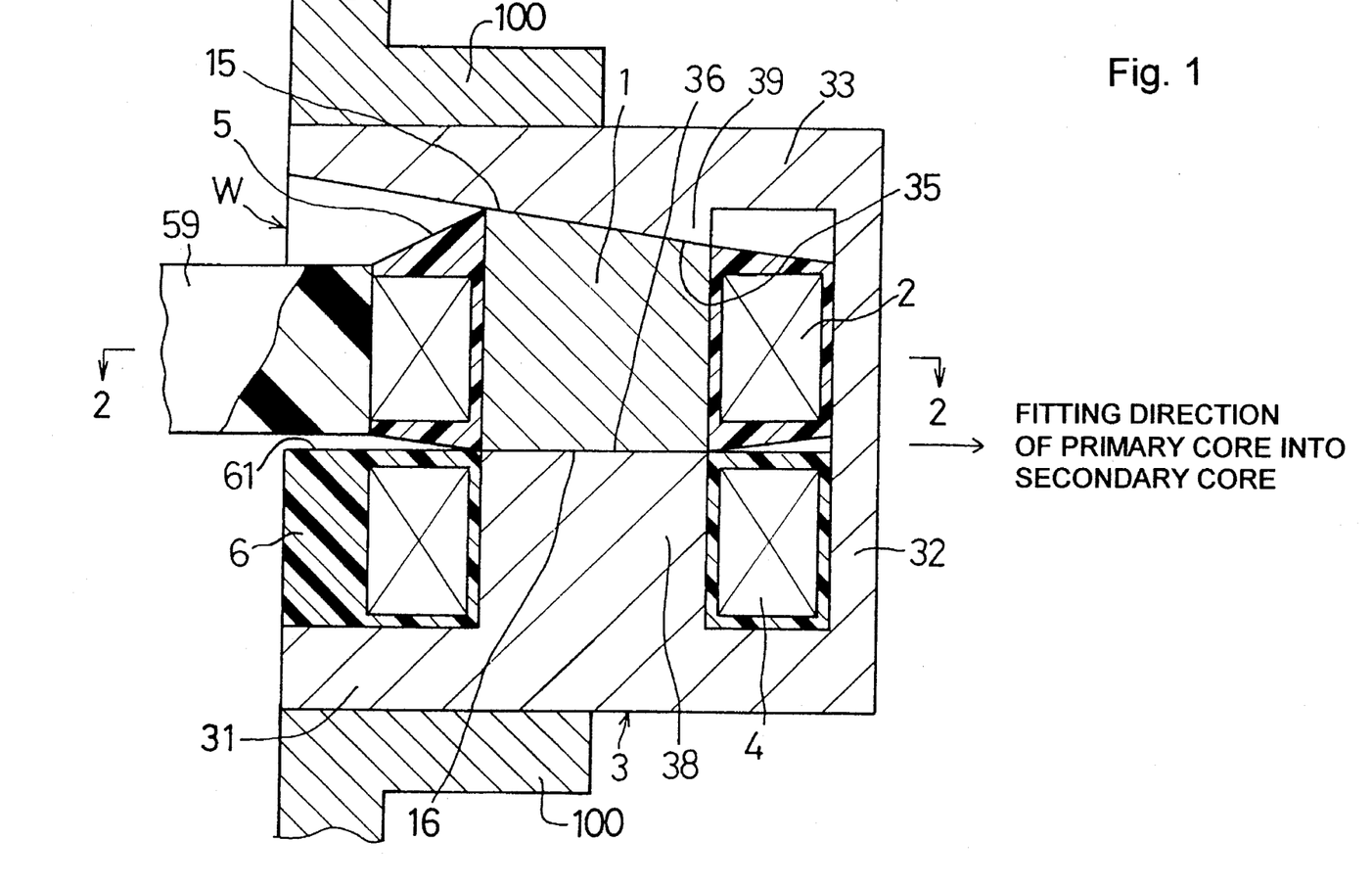
FIG. 1 is a cross-sectional view of a First Preferred Embodiment of an electromagnetic power supplying apparatus according to the present invention, the cross-sectional view being taken parallel to the coil axis and in the direction of fitting the primary core into the secondary core.
Figure 2:
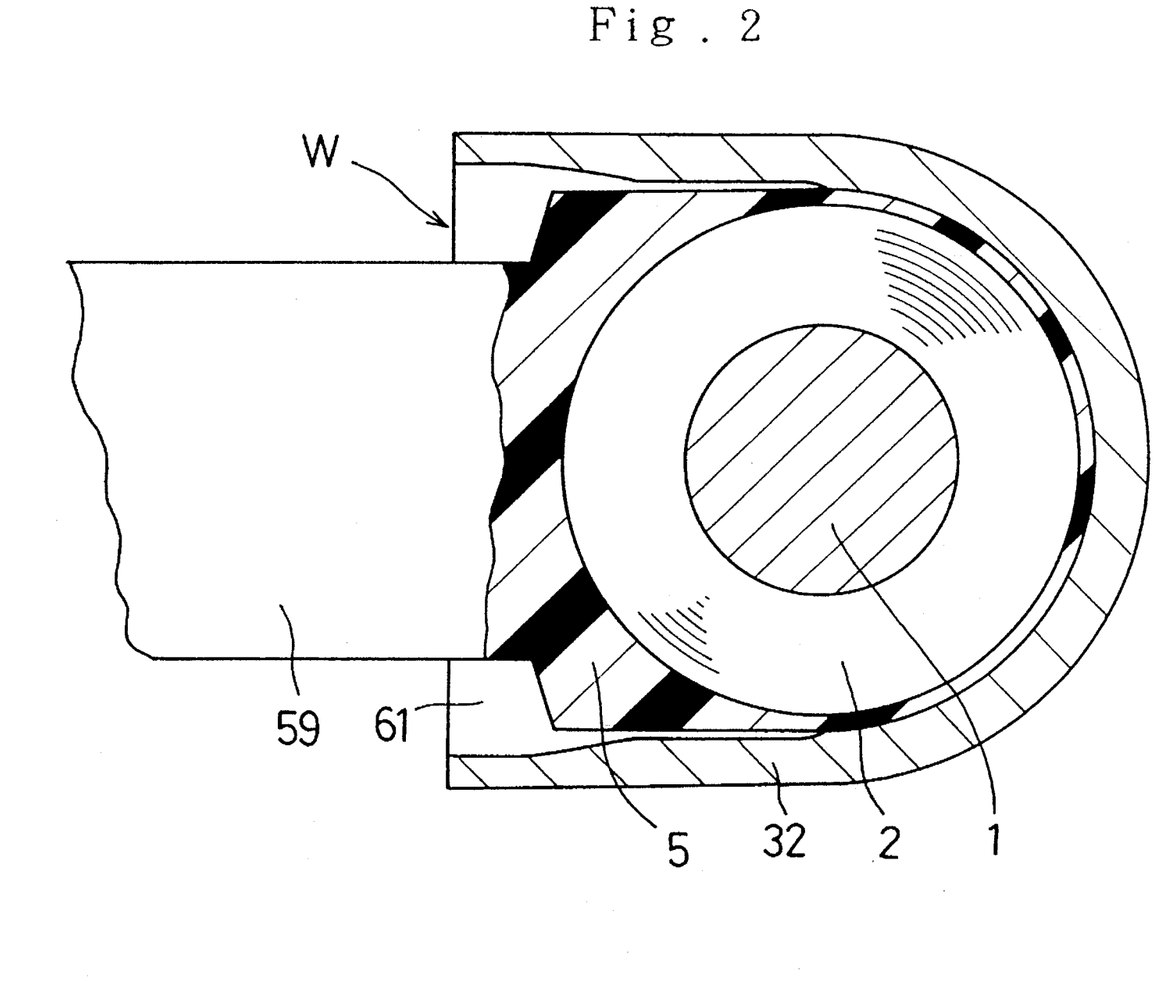
FIG. 2 is a cross-sectional view of the First Preferred Embodiment of the present electromagnetic power supplying apparatus, the cross-sectional view being taken perpendicularly to the coil axis along the line 2—2 of FIG. 1.
Figure 3:
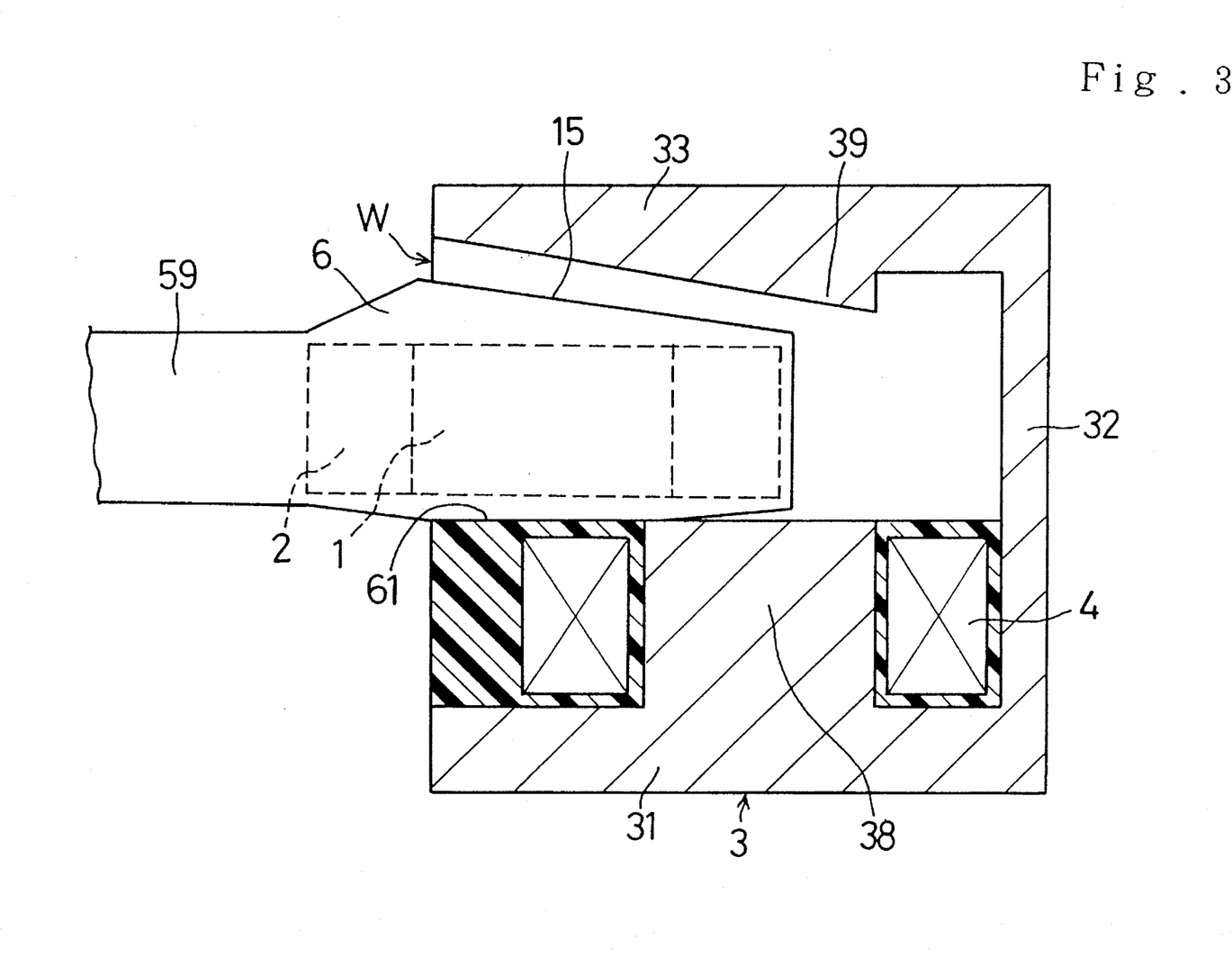
FIG. 3 is a cross-sectional view of the First Preferred Embodiment of FIG. 1 which illustrates fitting the primary core into the secondary core.
Figure 4:
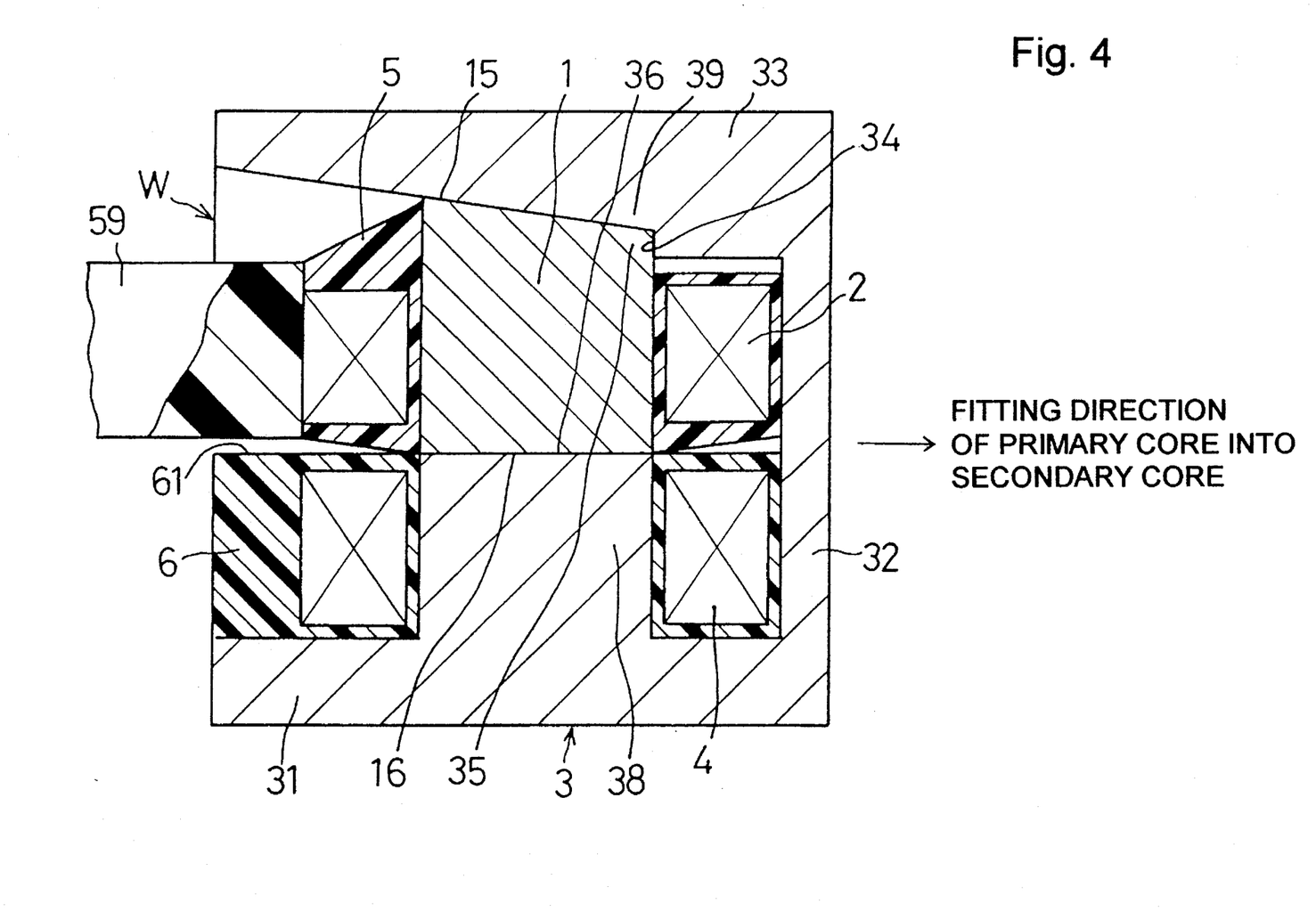
FIG. 4 is a cross-sectional view of a Second Preferred Embodiment of the present electromagnetic power supplying apparatus, the cross-sectional view being taken parallel to the coil axis and in the direction of fitting the primary core into the secondary core.

The First Preferred Embodiment of the electromagnetic power supplying apparatus according to the present invention will be hereinafter described with reference to FIGS. 1 through 3. FIG. 1 is a cross-sectional view which is taken parallel with the direction of fitting the primary core into the secondary core along a plane containing the coil axis. FIG. 2 is a cross-sectional view which is taken in the direction of the arrows 2—2 of FIG. 1 (i.e., perpendicular to the coil axis). FIG. 3 is a cross-sectional view which is taken parallel to the coil axis and illustrates the process of fitting the primary core into the secondary core.

The primary core 1 is formed in a cylindrical shape having a reduced height, and a primary coil 2 is wound around the primary core 1. The primary core 1 is brought into close contact with magnetic flux in-out end surfaces 35 and 36 of a secondary core 3 at both end surfaces (i.e., magnetic flux in-out end surfaces) 15 and 16 thereof. The magnetic flux in-out end surface 15 is tapered from wide to narrow in the direction of fitting the primary core 1 into the secondary core 3.

The primary coil 2 is covered with a supporting member 5 made of resin. The primary core 1, the primary coil 2 and the supporting member 5 are formed, as a whole, so as to constitute a disk shape having a large diameter. In addition, a hand grip 59 adapted for holding is disposed so as to extend from the fitting-trailing end (e.g. the left end in FIG. 1) of the supporting member 5 in the direction opposite to the fitting direction.

The secondary core 3 is disposed on a vehicle body 100. Further, it includes a bottom plate member 31, an outer wall member (or an end leg member) 32, a top plate member 33 and center pillar members 38 and 39, and it has a cross-section of letter "O" shape parallel to the coil axis and perpendicular to the direction of fitting the primary core 1 into the secondary core 3.

The bottom plate member 31 and the top plate member 33 have a cross-section including a combination of a semi-circle and a semi-quadrangle when they are viewed in the direction of the coil axis, and they are disposed spaced from each other at a predetermined interval and extending in the direction perpendicular to the coil axis (i.e., in the direction of fitting the primary core 1 into the secondary core 3).

The center pillar member 38 is disposed so as to project upward from the center of the top surface of the bottom plate member 31 in the direction of the coil axis. The center pillar member 39 is disposed perpendicularly downward from the center of the bottom surface of the top plate member 33 in the direction of the coil axis.

The secondary coil 4 is wound around the center pillar member 38. The center pillar member 38 is formed with a flat surface at the free end which flat surface extends perpendicular to the coil axis and is capable of closely contacting the magnetic flux in-out end surface 16 of the primary core 1. The center pillar member 39 is formed with a reduced height, and it is formed with a tapered surface at the free end, which surface is capable of closely contacting with the magnetic flux in-out end surface 15 of the primary core 1. Thus, the center pillar members 38 and 39, and the primary core 1 constitute the center leg member of a tripod type closed magnetic circuit core.

As illustrated in FIG. 2, the outer wall member (or the end leg member) 32 is an enclosing member having a fixed thickness. It is formed with a "U"-shaped cross-section when it is viewed in the direction of the coil axis, and it is opened in the direction of fitting the primary core 1 into the secondary core 3. Further, it is formed in a shape so as to go along with the outer peripheries of the bottom plate member 31 and the top plate member 33 at the ends. Thus, the secondary core 3 is formed within a can-like enclosure having an opening "W" in the outer periphery and closed at the ends. The opening "W" is adapted for fitting the primary core 1 into the secondary core 3 in the direction perpendicular to the coil axis.

Turning now back to FIG. 1, a supporting member 6 is filled in the lower half of the secondary core 3 so as to cover the secondary coil 4. The supporting member 6 has a top surface (i.e., the guide surface according to the appended claims of the present invention) which is flush with the free end surface of the center pillar member 38. Actually, the center pillar member 38 is coated with a thin silicone resin film on the free end surface. However, in this First Preferred Embodiment, the silicone resin film is not illustrated in the drawings, and it will not be described in detail herein.

In this First Preferred Embodiment, the primary core 1 and the secondary core 3 are comprised of a ferrite core, respectively. The supporting members 5 and 6 are comprised of epoxy resin, respectively.

The First Preferred Embodiment of the present electromagnetic power supplying apparatus thus constructed operates as follows. FIG. 3 illustrates how the primary core 1 is slid on the guide surface and is fitted into the secondary core 3 through the opening "W" of the secondary core 3 while a user holds the hand grip 59 with his hand.

As the primary core 1 is inserted into the secondary core 3, it is eventually engaged with the secondary core 3 by engaging the upper magnetic flux in-out end surface 15 with the free end surface of the center pillar member 39 of the secondary core 3. Thus, the positioning of the primary core 1 is completed with respect to the secondary core 3 at the engaging location.

Thereafter, a closed magnetic circuit is formed between the primary core 1 and the secondary core 3, and by supplying electric power to the primary coil 2, an output voltage is induced in the secondary coil 4.

With the aforementioned arrangements, the primary core 1, formed in a pillar shape having a reduced height, can be constituted with only a part of the center leg member of a tripod type closed magnetic circuit core. As a result, the primary core 1 can be significantly lighter in weight than the secondary core 3.

Further, the primary core 1 is fitted into the secondary core 3 while being guided by the upper surface 61 of the supporting member 6. Accordingly, the primary core 1 and the secondary core 3 are less likely to collide with each other during the positioning (i.e., the fitting of the primary core 1 into the secondary core 3). As a result, the primary core 1 and the secondary core 3 are inhibited from breaking.

Furthermore, the magnetic flux in-out end surface 15 of the primary core 1 and the free end surface of the center pillar member 39 of the secondary core 3, which joins to the magnetic flux in-out end surface 15, are tapered from wide to narrow in the direction of fitting the primary core 1 into the secondary core 3. Accordingly, the primary core 1 can be fitted into the secondary core 3 with ease, and it can be inhibited from being fitted thereinto any further when the supporting member 5 is brought into contact with the outer wall member 32 at the leading end. Additionally, since the magnetic flux in-out end surface 15 and the free end surface of the center pillar member 39 of the secondary core 3 are tapered and provided with an enlarged opposing area, respectively, the magnetic resistance can be reduced.

In the First Preferred Embodiment, it is possible to invert the primary side and the secondary side. Namely, the closed magnetic circuit can be formed between the primary core 1 disposed on the vehicle and the secondary core 3 disposed on the ground station. Upon supplying electric power to the secondary coil 3, an output voltage is induced in the primary coil 1.

Modified Version of the First Preferred Embodiment

Figure 6:
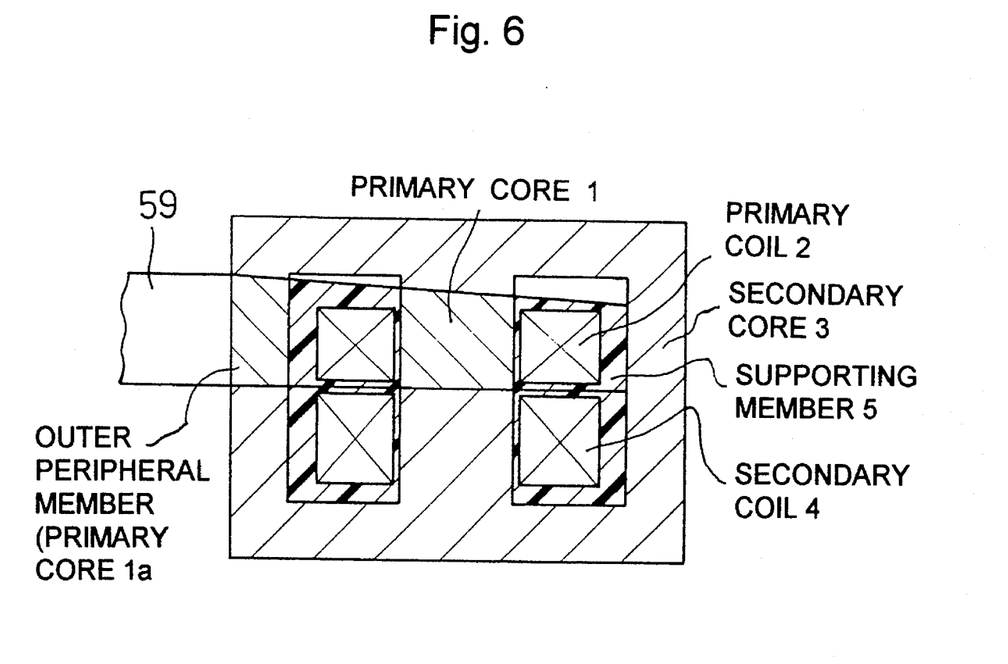
FIG. 6 is a cross-sectional view of a modified version of the First Preferred Embodiment of the present electromagnetic power supplying apparatus, the cross-sectional view being taken parallel to the coil axis.
Figure 7:
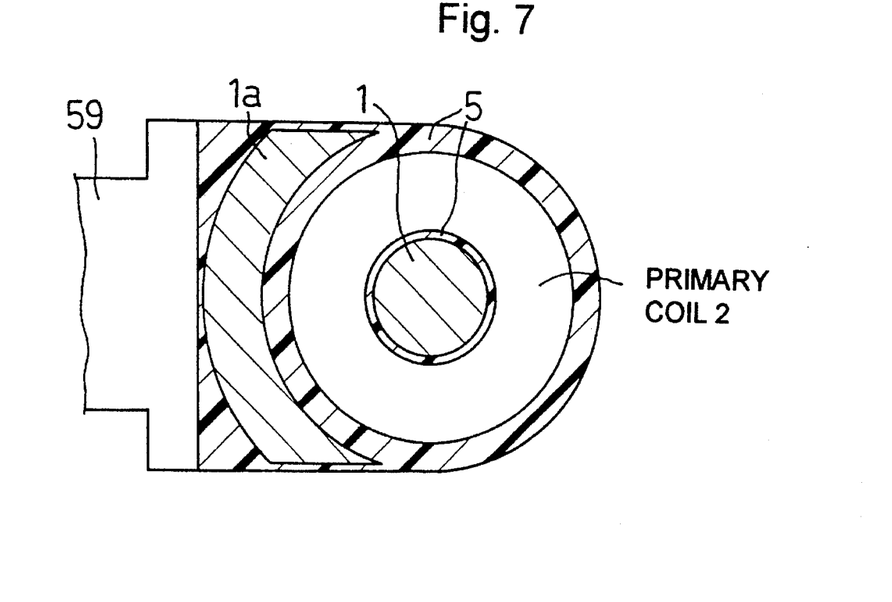
FIG. 7 is a cross-sectional view of the electromagnetic power supplying apparatus illustrated in FIG. 6, the cross-sectional view being taken perpendicular to the coil axis.

The First Preferred Embodiment of the present electromagnetic power supplying apparatus can be modified as illustrated in FIGS. 6 and 7. For instance, the primary core 1 can be further provided with an outer peripheral member 1a which is disposed adjacent the handle 59 on the trailing side of the coil 2 with respect to the insertion or fitting direction of the coil 2 into the secondary core 3 (e.g., the left end in FIG. 6). With the outer peripheral member 1a, the primary core 1 and the secondary core 3 can substantially constitute a complete cylindrical construction having a center pillar when they are combined. As a result, the leakage magnetic flux is further reduced.

Another Modified Version of the First Preferred Embodiment

Figure 8:
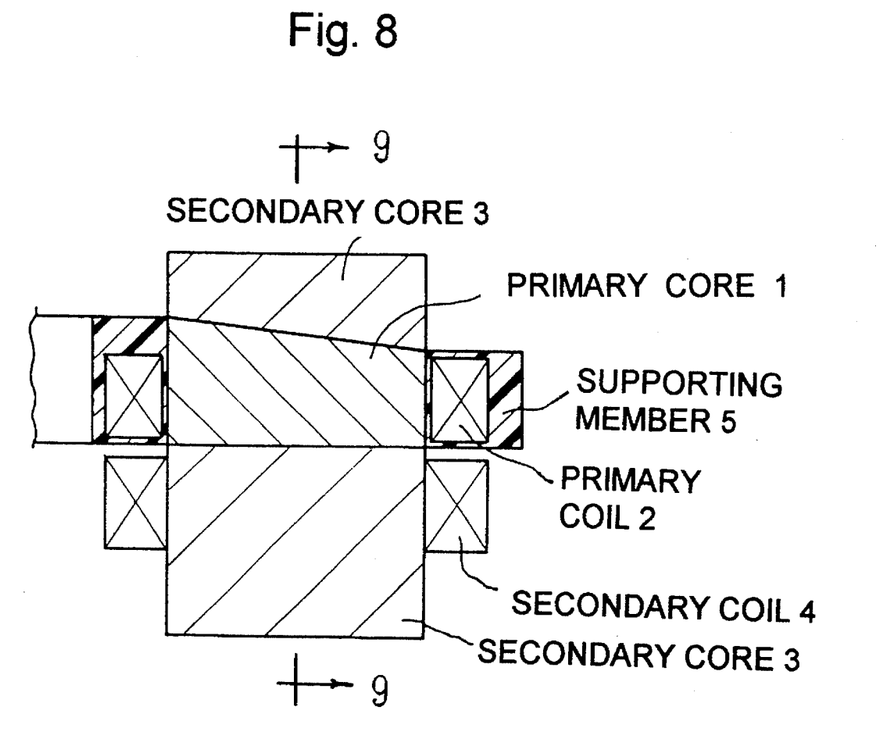
FIG. 8 is a cross-sectional view of another modified version of the First Preferred Embodiment of the present electromagnetic power supplying apparatus, the cross-sectional view being taken parallel to the coil axis.
Figure 9:
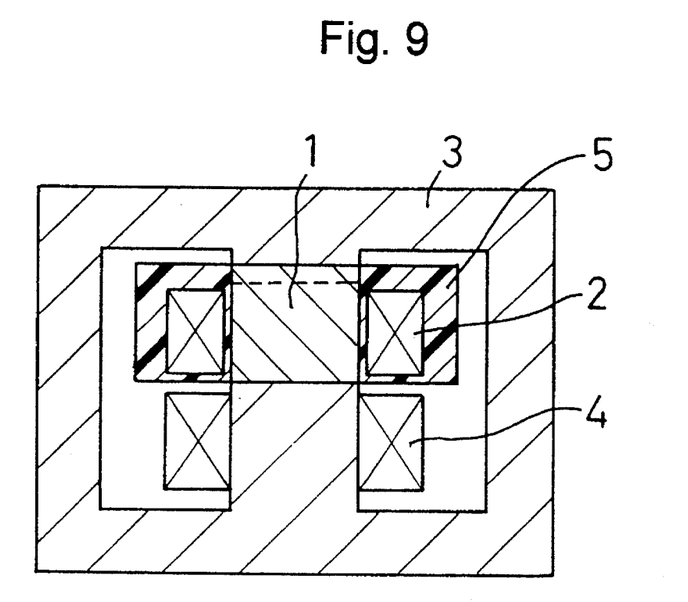
FIG. 9 is a cross-sectional view of the electromagnetic power supplying apparatus illustrated in FIG. 8, the cross-sectional view being taken along the line 9—9 in FIG. 8.

The First Preferred Embodiment of the present electromagnetic power supplying apparatus can be further modified as illustrated in FIGS. 8 and 9. For example, the secondary core 3 can be constructed so to form two chambers formed in a quadrangle shape in cross-section and spaced with a central leg portion (e.g., a lower half tripod member formed in a letter "E" shape laid on the longer side in cross-section, and an upper half member formed substantially in a letter "E" shape laid on the opening in cross-section and placed on the lower half tripod member) therein when it is combined with the primary core 1.

Third Preferred Embodiment

Figure 5:
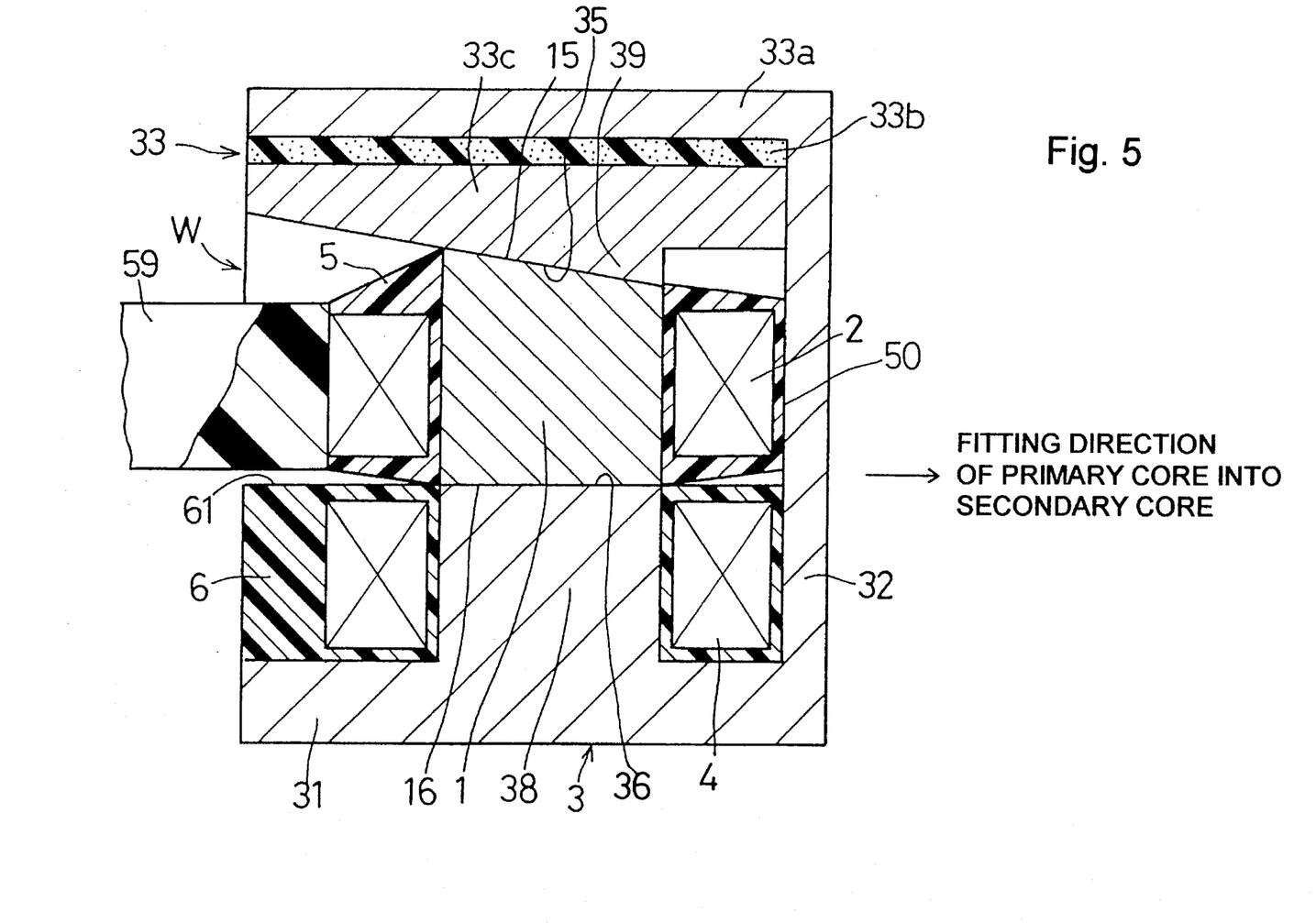
FIG. 5 is a cross-sectional view of a Third Preferred Embodiment of the present electromagnetic power supplying apparatus, the cross-sectional view being taken parallel to the coil axis and in the direction of fitting the primary core into the secondary core.

FIG. 5 illustrates the Third Preferred Embodiment of the present electromagnetic power supplying apparatus. As can be appreciated from the drawing, in this Third Preferred Embodiment, the top plate member 33 of the First Preferred Embodiment is modified as described below.

As illustrated in FIG. 5, the top plate member 33 of this Third Preferred Embodiment is formed to have a fixed thickness, and it includes a fixed flat plate member 33a extending from the end leg member (or the outer wall member) 32 perpendicular to the coil axis, an elastic plate member 33b made of a rubber plate containing soft magnetic particles and bonded to the bottom surface of the flat plate member 33a, and a movable plate member 33c bonded to the bottom surface of the elastic plate member 33b and adapted to be displaceable in the direction of the coil axes by the expansion and contraction of the elastic plate member 33b. The top plate member 33, including the component members 33a, 33b and 33c, is formed, as a whole, in the substantially same outer configuration as that of the top plate member 33 of the First Preferred Embodiment including the center pillar member 39.

In the embodiment of FIG. 5, the movable plate 33c constitutes a movable core member in the "unmovable" secondary core formed by the bottom member 31, the outer wall member 32, the center pillar member 38 and the fixed flat plate 33a.

In the Third Preferred Embodiment provided with the thus constructed top plate member 33, the movable plate member 33c is pressed substantially upward upon fitting the primary core 1 into the secondary core 3, and the elastic plate member 33b is contracted. When the leading end of the supporting member 5 is brought into contact with the inner surface of the end leg member 32 to complete the fitting of the primary core 1 into the secondary core 3, the elastic plate member 33b presses the movable plate member 33c downward. As a result, the gap is reduced or eliminated between the magnetic flux in-out end surfaces 15 and 16 of the primary core 1 and the magnetic flux in-out end surfaces 35 and 36 of the secondary core 3. Hence, the magnetic flux can penetrate to the side surface of the movable plate member 33c by way of the leg end member 32, and it can further penetrate to the top surface of the movable plate member 33c by way of the fixed flat plate member 33a and the elastic plate member 33b. It is possible, of course, to form convexities and convexities on the top surface and the other portions of the movable plate member 33c, in order to reduce the magnetic resistance between the end leg member 32 and the movable plate member 33c.

In the Third Preferred Embodiment with the thus modified arrangement, not only is the gap length reduced when supplying electric power to the primary coil 2, but also the primary core 1 and the secondary core 3 are inhibited from wedging together between the magnetic flux in-out surfaces 15 and 16 of the primary core 1 and the magnetic flux in-out surfaces 35 and 36 of the secondary core 3.

While mentioned above that the member 33b can be a rubber plate, it should be understood that the plate 33b can be formed from any suitable elastic resin which preferably contains magnetic particles.

Fourth Preferred Embodiment

The fourth preferred embodiment is explained with reference to FIG. 10.

This embodiment is characterized in that plural coil springs 33e are used instead of the elastic plate member 33b in FIG. 5.

A post 33f is provided to maintain the posture of the coil spring 33e, and it is inserted through a hole 33g which is formed in the fixed flat plate 33a. A plate 33h is a reinforced plate made of aluminum which is adhered to the upper surface of the movable plate member 33c which forms a movable core member. The post 33f is fixed to the reinforced plate 33h.

Furthermore, the lower surface 35 of the movable plate member 33c comprises a sliding or inclined surface portion 35a and a flat surface portion 35b. The sliding surface portion 35a is disposed at an opening side, and the flat surface portion 35b is disposed at a rear side. In accordance with this, the upper surface 15 of the movable primary core 1 also comprises a sliding or inclined surface portion 15a and a flat surface portion 15b. Therefore, when the movable primary core 1 is fully inserted, the sliding surface portion 15a approaches very close to the sliding surface portion 35a, and the flat surface portion 15b is very close to the flat surface portion 35b. The coil springs 33e are stressed so that the movable primary core 1 is squeezed, thereby minimizing the gap.

In the preferred embodiments 3 and 4, the movable plate member 33c must be dimensioned to permit a sliding fit where it contacts the inner surface of the outer wall member 32. In spite of the inevitable clearance gap, magnetic resistance between both members can be maintained small.

Figure 10:
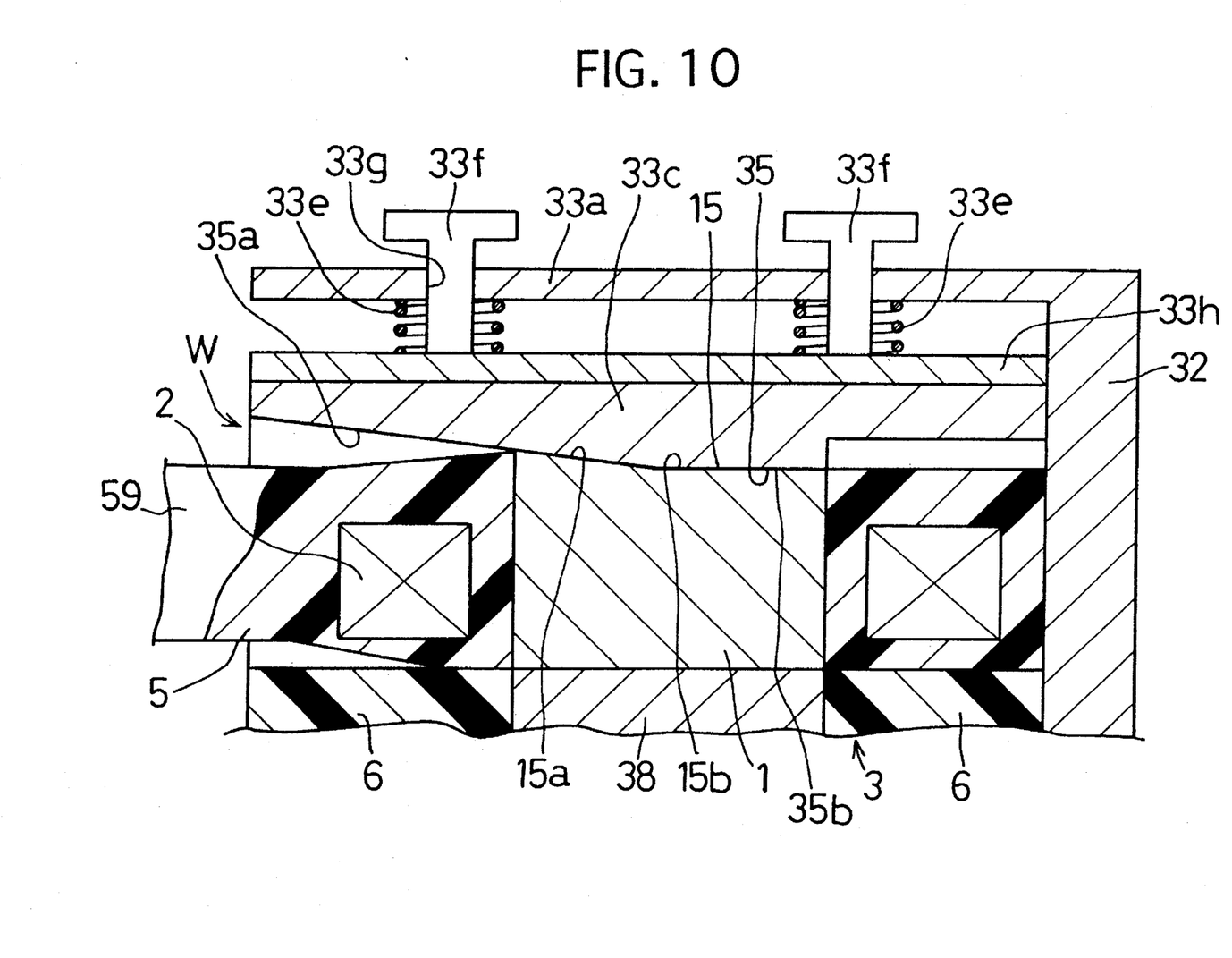
FIG. 10 is a cross-sectional view similar to FIG. 5 showing a fourth preferred embodiment of the invention.

The operation of the fourth embodiment as shown in FIG. 10 is essentially the same as that described with reference to FIG. 5. The remainder of the secondary core and coil, not shown in FIG. 10, can be the same as that shown and described with reference to FIG. 5.

Having now fully described the present invention, it will be apparent to one of ordinary skill in the art that many changes and modifications can be made thereto without departing from the spirit or scope of the present invention as set forth herein including the appended claims.

What is claimed is:

1. An electromagnetic power supplying apparatus for an electric motor vehicle comprising:

a primary winding structure having a primary coil wound around a primary core where said primary core is formed in the shape of a pillar with a reduced height;

a secondary winding structure having a secondary core where said secondary core has a central core portion about which is wound a secondary coil, a movable core member disposed opposite said central core portion with a gap therebetween for receiving therein said primary winding structure, and interconnecting core portions supporting said movable core member for movement relative thereto, said interconnecting core portions being joined to said central core portion for establishing a closed magnetic circuit linking said primary and secondary coils when said primary winding structure is inserted in said gap; and means for urging said movable core member against said primary core upon insertion of said primary winding structure in said gap.

2. The electromagnetic power supplying apparatus according to claim 1, wherein said central core portion of said secondary winding structure comprises a pillar member having a first end with a surface for detachably contacting said primary core, and wherein said interconnecting core portions comprise a bottom plate member extending from the opposite end of said pillar member, an outer wall portion extending from an outer peripheral portion of said bottom plate member past the periphery of and in contact with said movable core member, and a plate portion overlying said movable core member and joined to said outer wall portion.

3. The electromagnetic power supplying apparatus according to claim 2, wherein said urging means includes a rubber plate held by said overlying plate portion and engaging said movable core member pressing said movable core member against an exposed end of said primary core when the latter is inserted in said gap.

4. The electromagnetic power supplying apparatus according to claim 2, wherein said urging means includes at least one coil spring disposed between said overlying plate portion and said movable core member for pressing said movable core member against an exposed end of said primary core when the latter is inserted in said gap.

5. The electromagnetic power supplying apparatus according to claim 2, wherein said urging means includes an elastic resin plate held by said overlying plate portion and engaging said movable core member for pressing said movable core member against an exposed end of said primary core when the latter is inserted in said gap.

* * * * *